(12) United States Patent
Curran et al.

(10) Patent No.: US 11,982,297 B2
(45) Date of Patent: May 14, 2024

(54) LEAK TESTER

(71) Applicant: The Government of the United States, as represented by the Secretary of the Army, Washington, DC (US)

(72) Inventors: Kevin Curran, Madison Township, PA (US); Mikael Mead, Clifford Township, PA (US); Raymond Kerby, Stroudsburg, PA (US)

(73) Assignee: US Gov't, As represented by the Secretary of the Army

( * ) Notice: Subject to any disclaimer, the term of this patent is extended or adjusted under 35 U.S.C. 154(b) by 1313 days.

(21) Appl. No.: 15/814,442

(22) Filed: Nov. 16, 2017

(65) Prior Publication Data

US 2019/0145439 A1 May 16, 2019

(51) Int. Cl.
*F15B 19/00* (2006.01)
*G01M 3/00* (2006.01)
*G01M 3/04* (2006.01)
*G01M 3/26* (2006.01)

(52) U.S. Cl.
CPC .......... *F15B 19/005* (2013.01); *F15B 19/007* (2013.01); *G01M 3/007* (2013.01); *G01M 3/045* (2013.01); *G01M 3/26* (2013.01); *F15B 2211/855* (2013.01)

(58) Field of Classification Search
CPC ............................... G01M 3/28; G01M 3/2846
See application file for complete search history.

(56) References Cited

U.S. PATENT DOCUMENTS

| | | | | |
|---|---|---|---|---|
| 2,375,995 A * | 5/1945 | Kaeser | ................. | G01M 3/022 220/325 |
| 3,483,894 A * | 12/1969 | Finocchiaro | .......... | G01M 3/022 138/90 |
| 4,381,800 A * | 5/1983 | Leslie | ...................... | G01N 3/12 138/90 |
| 4,760,868 A * | 8/1988 | Saxon | ................... | F16L 55/136 D23/200 |
| 2008/0216560 A1 * | 9/2008 | Ridgway | ............ | G01M 3/3263 73/40.5 R |
| 2012/0024409 A1 * | 2/2012 | Kunzmann | ......... | F16L 37/0925 138/89 |
| 2013/0312846 A1 * | 11/2013 | Eriksen | .............. | H05K 7/20772 137/315.01 |
| 2015/0369689 A1 * | 12/2015 | Kotlyar | ............... | F16L 55/1283 73/49.8 |
| 2016/0250847 A1 * | 9/2016 | Gengrinovich | ...... | B41J 2/04508 347/14 |
| 2016/0266004 A1 * | 9/2016 | Van Nest | ............ | G01M 3/2846 |
| 2017/0176073 A1 * | 6/2017 | Lu | ....................... | G01M 3/2846 |

* cited by examiner

*Primary Examiner* — Nathaniel J Kolb
(74) *Attorney, Agent, or Firm* — Robert D. Jones

(57) ABSTRACT

A tester that can be quickly and easily connected and/or disconnected to a device is described. The tester can check for leaks in the device. The tester can provide a conduit for fluid to flow to the device and a flow meter reading can demonstrate that the device has leakage or no leakage.

5 Claims, 6 Drawing Sheets

LEAK TESTER

GOVERNMENT INTEREST

The innovation described herein may be manufactured, used, imported, sold, and licensed by or for the Government of the United States of America without the payment of any royalty thereon or therefor.

BACKGROUND

It can be costly and cumbersome to assemble an apparatus, only to find out after assembly that a part of the apparatus has a leak. Moreover, pressure testing a device may take a significant amount of time to complete. This significant amount of time can be due, in one example, to a lengthy time to physically couple and discouple the pressure testing device to the apparatus.

SUMMARY

In one embodiment, a leak tester for a device comprises a rod, a securer coupled to the rod, a gasket coupled to the securer, and a tip coupled to the gasket. The securer can be configured to be adjusted so as to pull the tip toward the securer, compressing the gasket against the device to create a seal. The seal can create a fluid permeability between fluid in the device and outside of the device to be about zero.

In another embodiment, a method of pressure testing a device using a tester, the tester comprising a rod; a securer coupled to the rod; a gasket coupled to the securer; and a tip coupled to the gasket can comprise experiencing an adjustment to the securer and pulling the tip toward the securer in response to the adjustment. The method can also comprise compressing the gasket against the device to create a seal and experiencing a flow of a fluid from an external source, through the rod and into the device. The seal can create a fluid permeability between fluid in the device and ambient fluid of about zero.

In yet another embodiment, a system comprises a tester comprising a rod that is not solid, a securer coupled to the rod, a gasket coupled to the securer, and a tip coupled to the gasket. The system can also comprise a gas connection element configured to be coupled to a supply. The supply can comprise a regulator configured to set a pressure of a gas that flows into the device and a flow meter configured to output a rate of gas flow into the device. The securer can be configured to be adjusted to pull the tip toward the securer, compressing the gasket against the device to create a seal. The seal can create a fluid permeability between fluid in the device and ambient fluid of about zero. The gas connection element can be configured to be connected to the rod to allow gas to flow through the gas connection element and through the rod. When the level of flow of the gas into the device is approximately zero, there is no leak.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
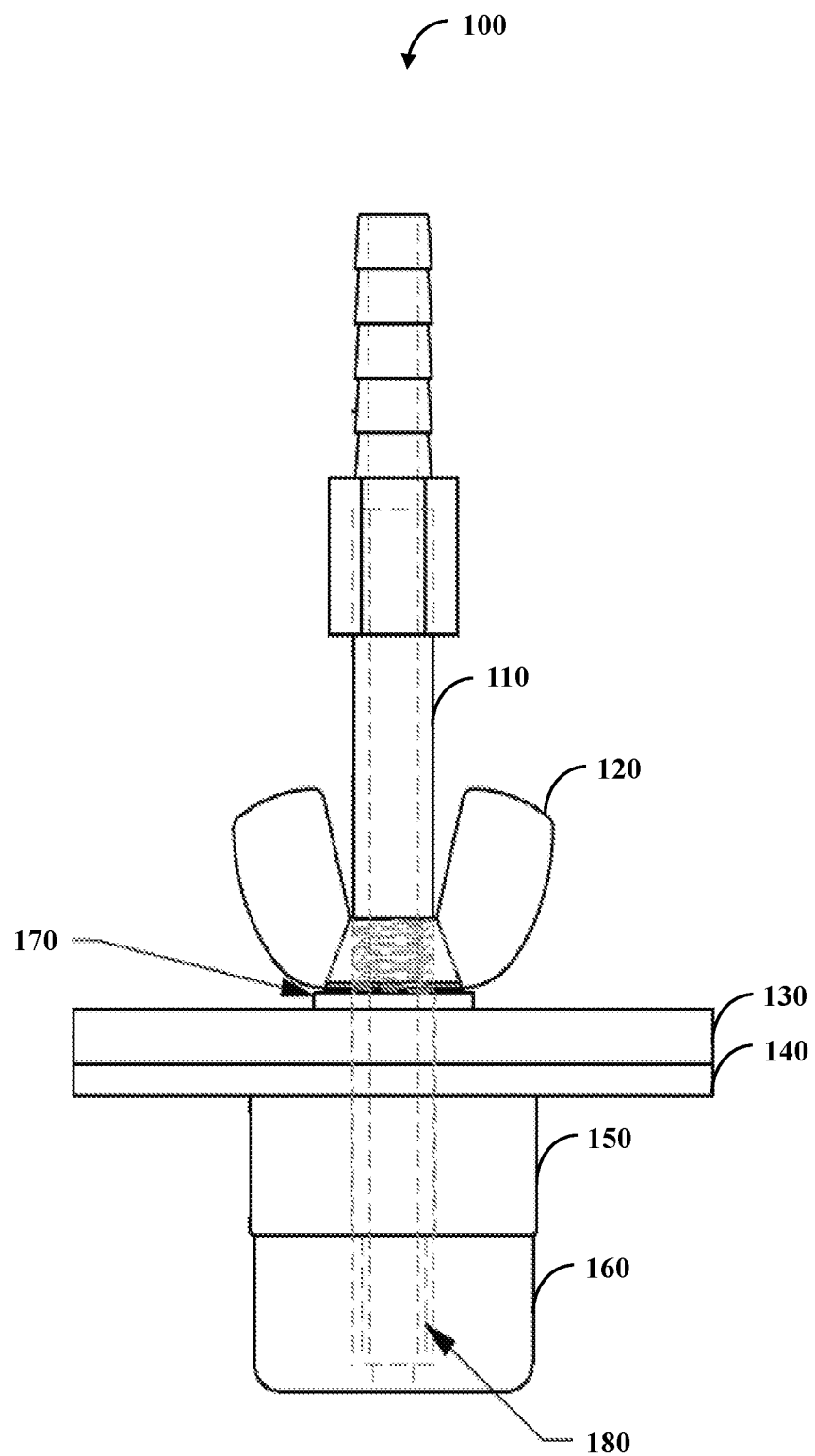
FIG. 1 illustrates one embodiment of a tester comprising a rod, a securer, a plate, a yielding material, a gasket, and a tip.

It can be beneficial to use a tester (e.g., pressure tester) that can be connected and disconnected quickly and easily to a device whose pressure being tested. The tester can be inserted into the device whose pressure is being tested. A seal can be created between the tester and the device such that a leak of the device can be easily identified.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components. Aspects disclosed herein can be performed by at least one component (e.g., a trainer component, a validation component, etc.).

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

FIG. 1 illustrates one embodiment of a tester 100 comprising a rod 110, a securer 120, a plate 130, a yielding material 140, a gasket 150, and a tip 160. The rod 110 can be not solid (e.g., not solid throughout and therefore hollow) and can be inserted through the plate 130, through the gasket 150, and at least into the tip 160. The securer 120 (e.g., a nut such as a wing nut) can be coupled to the rod 110, such that when the securer 120 is adjusted (e.g., tightened), the tip 160 can be pulled in the direction of the securer 120. This pulling can compress the gasket 150 against a device (e.g., the device identified as a device 210 of FIG. 2 below) whose pressure is being tested, such as by expanding the gasket 150 against an inner wall of the device. In addition, this pulling can cause a force on the plate 130 to cause compression of the yielding material 140 so that an area of an opening of the device is covered. Compression as discussed above, either individually or in combination, can create a seal between the device and the tester 100. The seal, achieved by the yielding material 140 and gasket 150, causes a fluid permeability between a fluid in the device (if any) and a fluid outside the device (if any) to be about zero. The yielding material 140 and/or the gasket 150 can be made of a material that yields to a force (e.g., the yielding material 140 is a rubber that changes shape when adequate pressure is applied from the plate 130.) The yielding material 140 can also prevent damage to the plate 130 and/or the device by creating a protective barrier between the device and the plate 130.

A washer 170 or similar item can be placed between the securer 120 and the plate 130 (e.g., prior to adjusting the securer 120) to distribute pressure evenly on the plate 130 and to minimize wear on the plate 130 (e.g., wear caused by hard materials repeatedly coming in contact with one another, thereby abrading against one another). The tip 160 can be made of a relatively hard material (e.g., a hard plastic material) and can include threading 180 for securing purposes. The dimensions of a cross sectional area of the tip 160 can be less than an interior cross section of the device at a point of connection between the tip 160 and the device. This can allow the tip 160 to fit inside the device.

Figure 2:
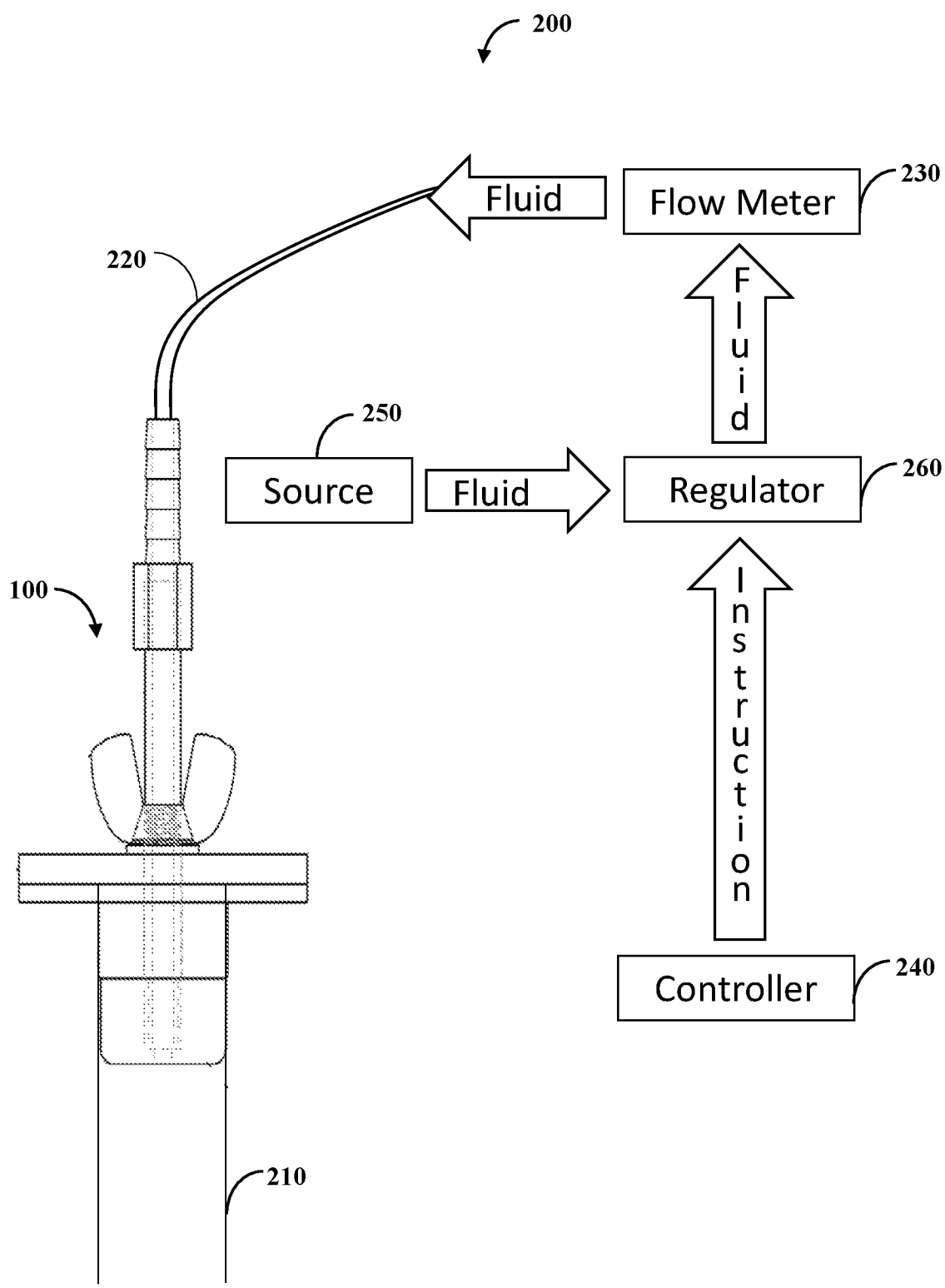
FIG. 2 illustrates one embodiment of an environment in which the tester is connected to the device for pressure testing.

FIG. 2 illustrates one embodiment of an environment 200 in which the tester 100 is connected to the device 210 for pressure testing. The environment includes a fluid connection element 220, a flow meter 230, a controller 240, a regulator 250, and a source 260. The fluid connection element 220 can connect at one end to the tester 100 (e.g., to the rod 110 of FIG. 1 of the tester 100) and can connect at another end to the flow meter 230. The controller 240 can send an instruction to the regulator 250. This instruction can be to supply a pressurized fluid from the source 260, through the regulator 250, through the flow meter 230, through the fluid connection element 220, thorough the tester 100, and ultimately to the device 210. This instruction can control an amount of fluid and/or the pressure of the fluid that flows to an interior of the device 210.

In one example, the controller 240 instructs the regulator 250 for the fluid to flow. The flow meter 230 can register a fluid flow to the device 210. After a set amount of time, the flow meter 230 can be read (e.g., by a person or by the controller 240). If the flow meter 230 indicates that flow continues, then this can indicate a leak to the device 210 if the tester 100 creates the seal. If the flow meter 230 illustrates lack of flow, then this can indicate a lack of a leak to the device 210 if the tester 100 creates the seal. In other words, if the fluid has nowhere to go, flow will stop. Conversely, if there is a leak, then the fluid will escape from the leak and therefore the flow will continue. In another example, the flow meter can function as a pressure sensor, where pressure is used to determine if there is a leak.

Figure 3:
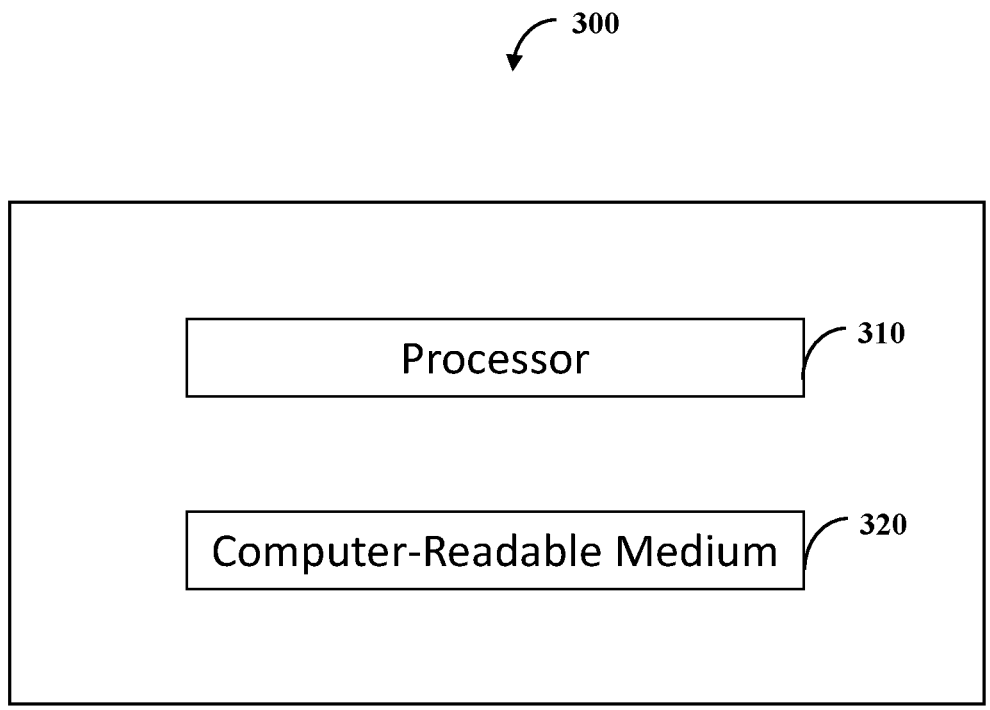
FIG. 3 illustrates one embodiment of a system comprising a processor and a non-transitory computer-readable medium.

FIG. 3 illustrates one embodiment of a system 300 comprising a processor 310 and a computer-readable medium 320 (e.g., non-transitory computer-readable medium). In one embodiment, the computer-readable medium 320 and the processor 310 form at least part of the controller 240 of FIG. 2. In one embodiment, the computer-readable medium 320 is communicatively coupled to the processor 310 and stores a command set executable by the processor 310 to facilitate operation of at least one component disclosed herein (e.g., a controller component configured to function as the controller 240 of FIG. 2). In one embodiment, at least one component disclosed herein (e.g., a construction component configured to manage construction of the tester 100 of FIG. 1) can be implemented, at least in part, by way of non-software, such as implemented as hardware by way of the system 300. In one embodiment, the computer-readable medium 320 is configured to store processor-executable instructions that when executed by the processor 310 cause the processor 310 to perform a method disclosed herein (e.g., the methods 400-500 addressed below). In one embodiment, the system 300 is at least part of the multi-material rapid prototyping machine discussed below with FIG. 5.

Figure 4:
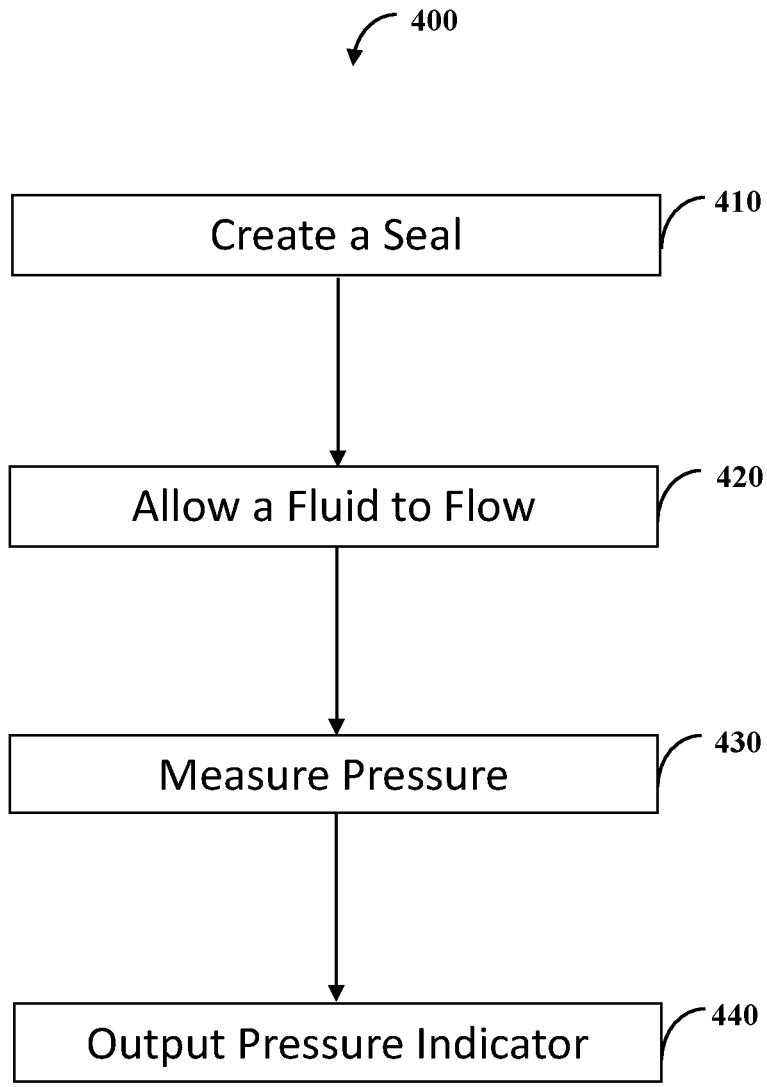
FIG. 4 illustrates one embodiment of a method comprising four actions.

FIG. 4 illustrates one embodiment of a method 400 of using the tester 100 of FIG. 1. At 410, creation of the seal by the tester 100 of FIG. 1 between the device 210 of FIG. 2 and outside elements can occur. At 420, fluid can flow from the tester 100 of FIG. 1 and into the device 210 of FIG. 2. The fluid can be liquid or gas. At 430, a pressure can be measured after the fluid flows to the device 210 of FIG. 2. Low pressure can indicate a leak while high pressure can indicate a lack of a leak. At 440, an indicator can be outputted of the pressure. This output can be a value or another indicator (e.g., a determination is made on if a leak exists or not and a red light or green light is lit).

Figure 5:
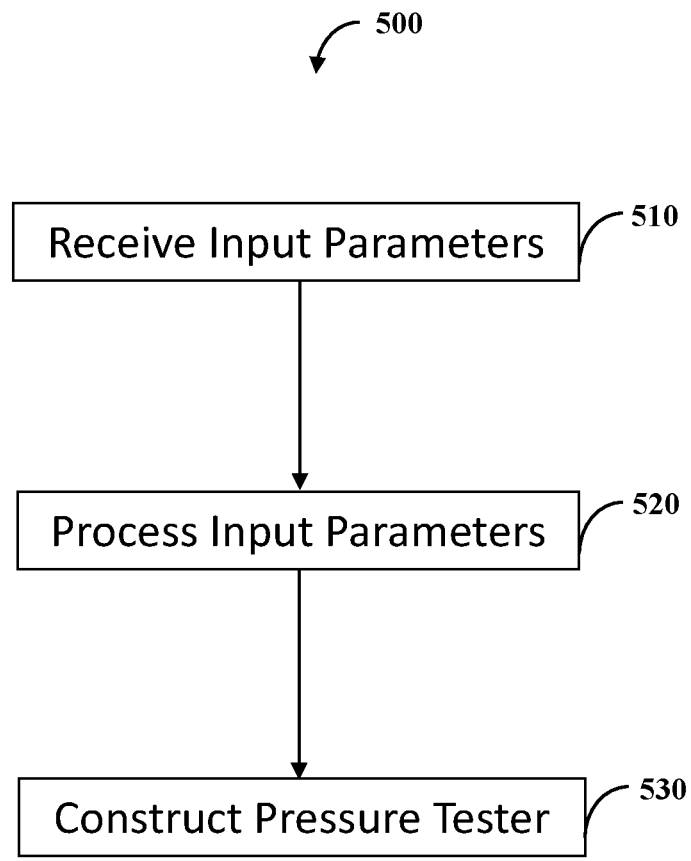
FIG. 5 illustrates one embodiment of a method comprising three actions.

FIG. 5 illustrates one embodiment of a method 500 of making at least part of the tester 100 of FIG. 1 using a multi-material rapid prototyping machine. At 510, the multi-material rapid prototyping machine can receive input parameters for such inputs as the dimensions of various portions of the tester 100 of FIG. 1, materials that make up the various portions of the tester 100 of FIG. 1, how the various portions of the tester 100 of FIG. 1 are to be joined, etc. At 520, the multi-material rapid prototyping machine can process the input parameters so that the tester 100 can be constructed at 530.

In one embodiment, the multi-material rapid prototyping machine can be used to make a substantial portion of the tester 100 of FIG. 1, rather than the entire tester 100 of FIG. 1. For example, the multi-material rapid prototyping machine can be used to make the rod 110 of FIG. 1, the plate 130 of FIG. 1, the yielding material 140 of FIG. 1, the gasket 150 of FIG. 1, and the tip 160 of FIG. 1, without making the securer 120 of FIG. 1 (e.g., the securer 120 of FIG. 1 can be obtained commercially off the shelf).

In one embodiment, the multi-material rapid prototyping machine can be used to make different embodiments of the tester. In one example, the yielding material 140 of FIG. 1 can be made of rubber or the yielding material 140 of FIG. 1 can instead be made of some other material such as a gel-like material or soft plastic. A user can input a selection on the material for the yielding material 140 of FIG. 1 that can be received as an input parameter at 510.

Figure 6:
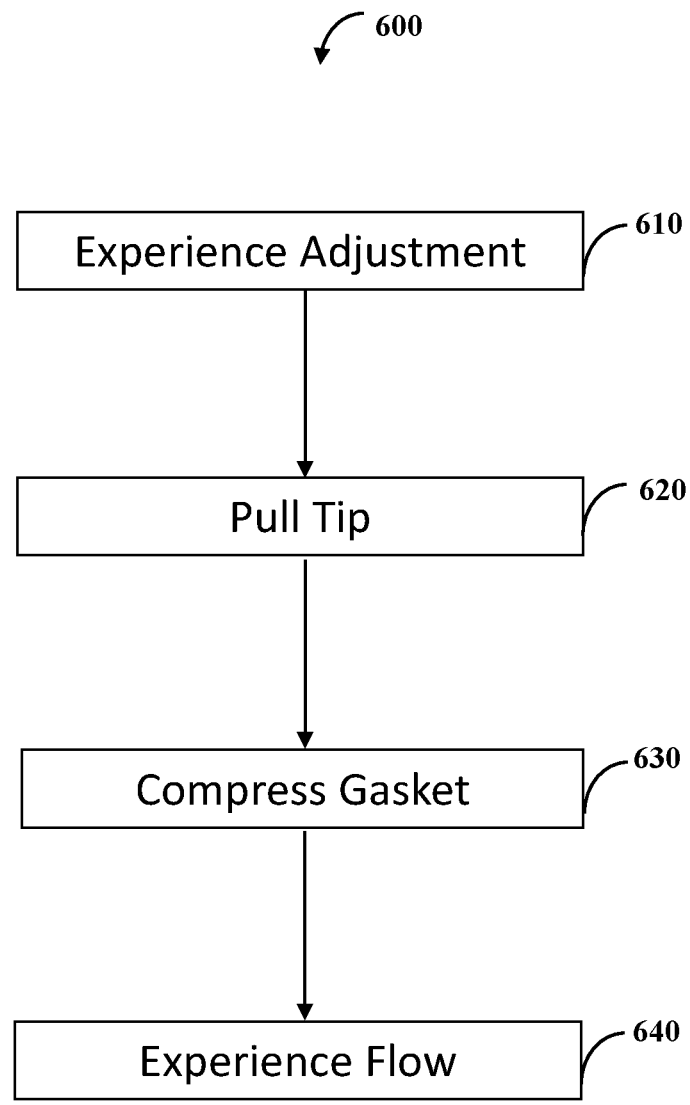
FIG. 6 illustrates one embodiment of a method comprising four actions.

FIG. 6 illustrates one embodiment of a method 600 comprising four actions 610-640. The method 600 can be a method of pressure testing the device 210 of FIG. 1 using the tester 100 of FIG. 1. At 610, the tester can experience an adjustment to the securer 120 of FIG. 1. At 620, pulling the tip 160 of FIG. 1 toward the securer can occur in response to the adjustment. At 630, compression of the gasket 150 of FIG. 1 against the device 210 of FIG. 2 to create the seal can take place. At 640, the tester 100 of FIG. 1 can experience a flow of a fluid from an external source, through the rod 110 of FIG. 1 and into the device 210 of FIG. 2. The seal can create a fluid permeability between fluid in the device and ambient fluid of about zero.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A leak tester for pressure testing a device, the leak tester comprising:
   a rod;
   a securer coupled to the rod;
   a plate through which the rod protrudes;
   a material distributed on a surface of the plate that faces the device, the rod protruding through the material;
   a gasket on the side of the material opposite the plate, the rod protruding through the gasket; and
   a tip coupled to the gasket, the rod protruding through the tip;
   where the securer is configured to be adjusted so as to pull the tip toward the securer, compressing the gasket against the device to create a seal along with the material yielding to some degree to create the seal,
   where the seal creates a fluid permeability between fluid in the device and outside of the device to be about zero,
   where a fluid connection element is connected to the rod to allow fluid to flow through the fluid connection element and through the rod,
   where the rod is not solid,
   where the fluid is a gas,
   where the fluid connection element comprises a barbed surface to grip a fluid connection,
   where the fluid connection element connects to a supply comprising a regulator configured to release a gas from a source that flows into the device and a gas flow meter configured to output a rate of gas flow into the device,
   where the device is a cylindrical device,
   where the leak tester abuts against an end of the cylindrical device,
   where the material distributed on the surface of the plate faces an interior area of the device in an unobstructed manner,
   where the material is a rubber that changes shape in response to a pressure,
   where the gasket directly connects to the tip without interruption of a second plate,
   where the material yields in response to a pressure from the plate caused by the tip being pulled,
   where the tip has a cross sectional area that is approximately equal to an interior cross sectional area of the device at a point of connection between the tip and the device,
   where the tip has a smaller cross sectional area than the plate such that the plate has a cross sectional area greater than the interior cross sectional area of the device,
   where the supply comprises a controller configured to send an instruction to the regulator,
   where the instruction is of an amount of the gas to supply and a gas pressure at which the gas is to be supplied, and
   where the rod experiences the gas supplied at the amount and at the gas pressure.

2. The leak tester of claim 1, comprising:
   a pressure sensor configured to sense a device pressure level of the device when the rod experiences the gas supplied at the amount and at the gas pressure; and
   a determination component configured to determine if the device has a leak based, at least in part, on the device pressure level.

3. The leak tester of claim 2, comprising:
   a visual indicator component configured to give a visual indication of the presence of the leak when the determination component determines that the device has the leak.

4. The leak tester of claim 3,
   where the visual indicator component is configured to give a visual indication of a lack of the leak when the determination component determines that the device does not have the leak.

5. The leak tester of claim 4,
   where the visual indication of the presence of the leak is lighting a light panel with a first color light,
   where the visual indication of the lack of the leak is lighting the light panel with a second color light, and
   where the first color light and the second color light are different colors.

* * * * *